(12) United States Patent
Alleman

(10) Patent No.: US 11,859,126 B1
(45) Date of Patent: Jan. 2, 2024

(54) METHOD OF USING CROSSLINKED GUAR POLYMER AS FLUID LOSS PILL

(71) Applicant: Alleman Consulting, LLC, Pearland, TX (US)

(72) Inventor: David J. Alleman, Pearland, TX (US)

(73) Assignee: Alleman Consulting, LLC, Pearland, TX (US)

( * ) Notice: Subject to any disclaimer, the term of this patent is extended or adjusted under 35 U.S.C. 154(b) by 518 days.

(21) Appl. No.: 16/044,313

(22) Filed: Jul. 24, 2018

(51) Int. Cl.
*E21B 33/138* (2006.01)
*C09K 8/514* (2006.01)
*C09K 8/504* (2006.01)
*E21B 21/00* (2006.01)
*C09K 8/508* (2006.01)

(52) U.S. Cl.
CPC ............ *C09K 8/514* (2013.01); *C09K 8/5045* (2013.01); *C09K 8/5083* (2013.01); *E21B 21/003* (2013.01); *E21B 33/138* (2013.01)

(58) Field of Classification Search
CPC ..... C09K 8/514; C09K 8/5083; E21B 21/003; E21B 33/138
USPC ........................................................ 166/292
See application file for complete search history.

(56) References Cited

U.S. PATENT DOCUMENTS

| | | | |
|---|---|---|---|
| 4,749,556 A | 6/1988 | Parrish et al. | |
| 6,632,779 B1 | 10/2003 | Vollmer et al. | |
| 7,207,388 B2 * | 4/2007 | Samuel | C09K 8/68 |
| | | | 166/305.1 |
| 7,651,980 B2 | 1/2010 | Jarrett et al. | |
| 8,030,389 B2 | 10/2011 | Tej et al. | |
| 8,067,343 B2 * | 11/2011 | Horton | C09K 8/512 |
| | | | 166/305.1 |
| 8,202,935 B2 | 6/2012 | Alzer et al. | |
| 8,633,291 B2 | 1/2014 | Ebbrecht et al. | |
| 8,664,165 B2 * | 3/2014 | Horton | C09K 8/54 |
| | | | 166/283 |
| 8,921,492 B2 | 12/2014 | Jennrich et al. | |
| 9,902,894 B2 | 2/2018 | Dwarakanath et al. | |
| 9,909,056 B2 * | 3/2018 | Chopade | E21B 43/26 |
| 2005/0101490 A1 * | 5/2005 | Vollmer | C09K 8/10 |
| | | | 507/100 |
| 2010/0126723 A1 * | 5/2010 | Ali | E21B 43/04 |
| | | | 166/292 |
| 2010/0197858 A1 | 8/2010 | Cavaleiro et al. | |
| 2016/0040057 A1 | 2/2016 | Favero et al. | |

FOREIGN PATENT DOCUMENTS

EP    1370603 B1    8/2006

OTHER PUBLICATIONS

Diacel® HE® Polymer 400, Chevron Phillips Safe Data Sheet, Revision date Sep. 5, 2017.
HE® 300 Polymer, Drilling Specialties Company, Jan. 2018.
HE® 150 Polymer, Drilling Specialties Company, Jan. 2018.
HE® Polymers, HE® Polymers for Viscosifying Brines in Drilling, Completion and Workover Applications, Drilling Specialties Company, Jan. 2015.
HE® 100 Polymer, Drilling Specialties Company, Jan. 2018.
Diacel® HE-400 Powder Cement Fluid-Loss Additive, Drilling Specialties Company, Jan. 2018.
DOWANOL Glycol Ethers, Health/Environmental Issues, The Dow Chemical Company, Dec. 1992.
Evonik Industries, Safety Data Sheet, Version 1.0/CN, Revision date Jul. 18, 2017, Tego Dispers 650.

* cited by examiner

*Primary Examiner* — William D Hutton, Jr.
*Assistant Examiner* — Ashish K Varma

(57) ABSTRACT

A fluid loss pill containing a brine and a crosslinked polymer of underivatized guar or a derivatized guar and puffed boron or ulexite crosslinking agent. The brine may be a heavy brine having a density greater than 11.0 ppg.

18 Claims, No Drawings

METHOD OF USING CROSSLINKED GUAR POLYMER AS FLUID LOSS PILL

FIELD

The disclosure relates to a fluid loss pill containing a crosslinked polymer of underivatized guar or derivatized guar and a puffed boron or ulexite crosslinking agent.

BACKGROUND

A wide variety of well treatment fluids are typically used in the recovery of hydrocarbons from subterranean formations. Such fluids include drilling fluids or muds, drill-in fluids, completion fluids, work-over fluids, packer fluids, spacer fluids, fracturing fluids and displacement fluids. Fluids are often lost in productive zones exhibiting high permeability. Such fluid loss can damage the formation. To maintain the hydrostatic integrity of the wellbore and reduce formation damage during these operations, fluid loss control pills are often used. The fluid loss agent temporarily seals the reservoir.

Fluid loss control pills often comprise a brine and a gelling agent. In many cases, fluid loss control pills are utilized in a gelled state when performing a treatment operation. In other cases, the gelling can be delayed so that the complete gelled state is not achieved until the fluid loss agent is at a desired location where it is used to temporarily divert or block the flow of fluids within at least a portion of a subterranean formation.

Typically, the brine is characterized by a density ranging from about 8.5 pounds per gallon (ppg) to about 20 ppg. Lower density brines are usually single salt fluids e.g., NaCl, NaBr, $CaCl_2$) or $CaBr_2$ salt in water, and the density may be as high as 12.7 ppg (NaBr) and 15.3 ppg ($CaBr_2$). Mid-range density fluids, ranging from 11.6 ppg to 15.1 ppg, are typically two salt solutions, such as $CaCl_2$/$CaBr_2$. High density brines, having a density from 14.5 to 19.2 ppg, typically contain zinc or are composed of three salts. Brines containing divalent salts, such as calcium bromide, calcium chloride, zinc bromide/calcium bromide, zinc bromide/calcium bromide/calcium chloride and zinc bromide, are often more desirable in light of their wide density range and since they are typically substantially free of suspended solids.

Operators typically choose a brine for a treatment operation based on the true vertical depth (TVD), bottom hole pressure (BHP) and bottom hole temperature (BHT) of the well being treated. Further, since the brine is subjected to heating and cooling during the treatment operation, the temperature profile along the entire path to which the brine is exposed during the treatment operation is also considered. Higher density brines are typically needed in operations encountering high temperature high pressure conditions. High density brines (for instance having a density greater than 11 or even greater than 12.5 ppg) are typically used when over-pressured and/or highly permeable and/or poorly consolidated formations are penetrated.

Conventional fluid loss pills consist of one or more crosslinked cellulosic polymers, such as hydroxyethyl cellulose (HEC). Because of the high temperature, high shear, high pressures and low pH to which well fluids are exposed, HEC based fluid loss pills tend to degrade quickly. A dramatic reduction in viscosity has been noted in fluid loss pills containing cellulosic derivatives at static bottom hole temperatures (BHT) above 250° F. Generally, HEC based fluid loss pills are known to degrade and become sufficiently unstable in environments greater than 250° F. Reduction in viscosity of such brine based fluids at in-situ conditions often results in leak-off into the formation.

Further complications have been noted with cellulosic based fluid loss pills containing divalent heavy brines, such as calcium and zinc salts. When the fluid loss pill is degraded at a temperature less than 250° F., calcium and zinc cations are released. Such cations are known to form highly stable, acid-insoluble compounds in-situ. In addition, due to the high density of such brines, stratification tends to further inhibit their removal upon leak-off. Fluid loss pills containing a high density brine and which are thermally stable (exhibiting high viscosity) at temperatures greater than 250° F. are desired. Such fluid loss pills should not only maintain their viscosity under high temperature and pressure operating conditions, they should further not damage the permeability of the formation when used in treatment operations at such conditions.

SUMMARY

In an embodiment disclosed herein, a fluid loss pill is provided. The fluid loss pill contains a brine and a crosslinked polymer of underivatized guar or a derivatized guar and a puffed boron or ulexite crosslinking agent. In a preferred embodiment, the brine contains calcium and/or zinc. The fluid loss pill may contain hydroxypropyl guar, carboxymethyl guar or carboxymethyl hydroxypropyl guar or a mixture thereof.

In another embodiment, a fluid loss pill is provided which contains (i) brine; (ii) a crosslinked polymer of underivatized guar or derivatized guar and a puffed boron or ulexite crosslinking agent; and (iii) glycerol and/or a copolymer of either a sodium salt of sulfonated acrylamide and a vinyl lactam or a polymeric system comprising a polyacrylamide and a sodium salt of a sulfonated acrylamide. A slurry may be formed containing the combination of glycerol and the crosslinked polymer, optionally with the copolymer. The slurry may further contain a dispersant, as well as a hydrophobic glycol and/or hydrophilic glycol.

In another embodiment, a two-component fluid loss pill is provided containing (a) from about 90 to about 98 volume percent of brine, preferably a brine having substantial divalent metal ion (e.g., calcium and zinc) content; and (b) from about 2 to about 10 volume percent of a crosslinked polymer of underivatized or derivatized guar and a crosslinking agent selected from the group consisting of puffed boron or ulexite. Conventional additives may be added to the fluid loss pill if desired.

In another embodiment, a fluid loss pill is disclosed comprising a brine of divalent metal (such as calcium and/or zinc) and a slurry. The slurry contains a crosslinked polymer of underivatized or derivatized guar and a crosslinking agent selected from the group consisting of puffed boron or ulexite. The slurry further contains a copolymer of (a) a sodium salt of sulfonated acrylamide and a vinyl lactam; or (b) polyacrylamide and a sodium salt of a sulfonated acrylamide as well as glycerol, a hydrophilic oxygenated solvent, a hydrophobic oxygenated solvent and an organic dispersant.

In another embodiment, a method for reducing fluid loss into a subterranean formation penetrated by a well is provided wherein a fluid loss pill is pumped into the well. The fluid loss pill contains brine and a crosslinked polymer of underivatized guar or a derivatized guar and a puffed boron or ulexite crosslinking agent.

In another embodiment, a method of reducing fluid loss from a well is provided. In this embodiment, a fluid loss pill is emplaced into a well which penetrates a subterranean formation. The fluid loss pill contains brine, an underivatized guar or a derivatized guar and a crosslinking agent. The crosslinking agent is puffed boron and ulexite or a mixture thereof. The viscosity of the fluid loss pill is increased under in-situ operating conditions at a targeted location within the well.

In another embodiment, a method of reducing fluid loss from a well is provided. In this embodiment, a fluid loss pill is emplaced into a well which penetrates a subterranean formation. The fluid loss pill contains brine and a slurry of a crosslinked polymer of underivatized guar and a crosslinking agent selected from boron or ulexite or a combination thereof. The slurry may further contain glycerol as well as a copolymer of either a sodium salt of sulfonated acrylamide and a vinyl lactam or a polymeric system comprising a polyacrylamide and a sodium salt of a sulfonated polyacrylamide. The slurry may further contain a hydrophobic glycol ether with a hydrophilic glycol ether as well as an organic dispersant. The viscosity of the fluid loss pill is increased under in-situ operating conditions at a targeted location within the well.

Other aspects and advantages of the disclosure will be apparent from the following description.

DETAILED DESCRIPTION

The description, being of exemplary embodiments, is not intended to limit the claims of this disclosure. On the contrary, the intention is to cover all modifications, equivalents and alternatives falling within the spirit and scope of the claims. Many changes may be made to the particular embodiments and details disclosed herein without departing from such spirit and scope.

Certain terms are used herein and in the appended claims to refer to particular components. As one skilled in the art will appreciate, different persons may refer to a component by different names. This document does not intend to distinguish between components that differ in name but not function. Also, the terms "including" and "comprising" are used herein and in the appended claims in an open-ended fashion, and thus should be interpreted to mean "including, but not limited to . . . ." Further, reference herein and in the appended claims to components and aspects in a singular tense does not necessarily limit the present disclosure or appended claims to only one such component or aspect, but should be interpreted generally to mean one or more, as may be suitable and desirable in each particular instance.

All ranges disclosed herein are inclusive of the endpoints, and the endpoints are independently combinable with each other. All references cited herein are incorporated herein by reference.

Fluid loss from the fluid loss control pills described herein into the well or the subterranean formation penetrated by the well is minimal. Further, the highly viscous pill reduces friction pressure and thus is highly useful in pumping operations. Further, the fluid has been demonstrated to minimize formation impairment.

The fluid loss pill exhibits high viscosity and is stable at bottom hole temperatures in excess of 275° F., typically greater than 300° F. The fluid loss pill may be stable for extended periods, in some cases greater than 20 hours and in some cases greater than 24 hours, for instance, at 275° F. and in some cases greater than 20 hours at 300° F. Thus, unlike conventional polymer based fluid loss control additives, the fluid loss pill disclosed herein is stable even in high-temperature wells.

The enhanced stability of the fluid loss pill allows it to be stored for later use. Because of the constantly changing conditions in the wellbore, it is often desirable to have the flexibility to store a fluid loss pill for a period of time, prior to use.

The fluid loss pill contains a brine and a crosslinked polymer of a galactomannan and a puffed boron or ulexite crosslinking agent. The reference herein to "crosslinked polymer" shall include a fully crosslinked polymer as well as a partial crosslinked polymer. Typically, the crosslinked polymer in the fluid loss pill exhibits sufficient viscoelastic properties, in particular relatively high viscosities (e.g., at least about 300-500 cP at a shear rate of 100 $sec^{-1}$). The partial crosslinked polymer typically is a gel which exhibits "lipping". A lipping gel is distinguishable from a liquid which freely pours out of a container. Characteristics of a lipping gel are discussed in U.S. Pat. No. 7,814,980. As used herein, "lipping" shall refer to a gel having sufficient homogeneous, three-dimensional elasticity on a macroscopic level with very few, if any, distinct micro-domains. Thus, a lipping gel thus may consist of the galactomannan not being fully crosslinked with the puffed boron or ulexite crosslinking agent.

In an embodiment, the fluid loss pill is introduced into a targeted location within the well. At the targeted location, the viscosity of the fluid loss pill may increase under in-situ operating conditions. At this stage, the partial crosslinked polymer becomes fully crosslinked and prevents fluid leakoff into the well or into the formation penetrated by the well.

Once emplaced and gelled, the fluid loss pill may be optionally removed by injecting a conventional breaker fluid into the wellbore.

An embodiment of the disclosure is a two-component fluid loss pill comprising the crosslinked polymer and the brine. While other components may be added to alter or stabilize fluid properties if necessary, typically, the fluid loss pill is free of such solid components. For instance, the fluid loss pill does not require solid additives or particulates such as starch, sized salts, carbonate chips, mica or other particulates (though the fluid is compatible and can be used with these materials). Such additives and particulates are known to cause formation damage.

The fluid loss pill provided disclosed provides viscosity controlled fluid loss rather than particulate (filter cake) controlled fluid loss, making the fluid loss easier to remove and non-damaging.

The base fluid of the brine may be fresh water or sea water.

Preferred galactomannans are underivatized guar and guar derivatives such as hydroxypropyl guar, carboxymethyl guar and carboxymethyl hydroxypropyl guar as well as mixtures thereof. There is no need to further derivatize the galactomannan. In a preferred embodiment, the hydratable polymer is hydroxypropyl guar.

The crosslinker is typically a puffed boron or ulexite. Typically, the crosslinked polymer contains from about 0.1 to about 2.5 volume percent of the crosslinking agent; the remainder being the galactomannan gum.

In a preferred embodiment, the crosslinking agent is a puffed boron consisting of low density particles or beads having a high surface area and large quantities of voids. Generally, each particle is comprised of a plurality of expanded cells adjacent to and attached to each other. The density of the particles typically ranges from about 0.05 to about 0.40 $g/cm^3$, the bulk density is typically from about 150 to about 350 g/l, and the particle diameter is typically from about 420 to about 1,000 μm. The particle size of the puffed boron may be non-uniform as demonstrated by the puffing (the ratio between the diameter of the puffed particle and the diameter of the feed particle yielding the puffed particle). For instance, the smaller or lighter feed particles may be puffed in excess over the larger denser feed particles to provide a higher puff ratio. In other embodiments, the puffed boron consists of a more uniform ratio of expanded particles wherein a particle size distribution (PDS) curve of the puffed boron is substantially similar in shape to the PSD curve for the feed borax, thereby providing a lower puff ratio. The bead strength of the puffed boron is greater when the puff ratio is lower. See, for instance, U.S. Pat. No. 4,412,978. Typically, the void volume of the puffed boron is from about 2.1 to about 3.5 cm$^3$/g.

Puffed boron may be prepared by rapidly heating particulate borax pentahydrate particles to above the melting temperature of the pentahydrate, wherein the borate dissolves in its own water of hydration causing the solution to erupt through the partially dehydrated crystal surface. Other methods of making puffed boron are disclosed in U.S. Pat. Nos. 3,454,357; 3,944,651; 4,412,978; and 4,547,352. Suitable methods for making puffed boron are disclosed in R. C. Rhees and H. H. Hammar, "Puffed Borax", *Soap and Chemical Specialties*, Vol. XLII, January, 1966 (pp. 58-61 and 118-120).

Further suitable as puffed boron is the reticulated particle set forth in U.S. Pat. No. 4,547,352 which exhibits an enhanced absorptive capacity.

Though not preferred ulexite, having the formula (Na$_2$Ca$_2$B$_{10}$O$_{18}$·H$_{16}$H$_2$O), may be used in some instances as crosslinking agent.

The fluid loss pill may be composed of any brine including ammonium chloride and monovalent salt brines such as sodium bromide, potassium chloride, sodium acetate, sodium formate, sodium chloride, potassium acetate, potassium formate and mixtures thereof, such as mixtures of sodium chloride and sodium bromide, mixtures of potassium chloride and calcium chloride, etc. The disclosure, however, is of particular value when used with heavy brines, i.e., in particular calcium and/or zinc containing brines and brines having a density in excess of 11.0, typically greater than 12.5. Such brines include divalent salts such as calcium chloride, calcium bromide, zinc bromide, as well as binary, mixtures of heavy salts such as calcium chloride and calcium bromide, zinc bromide and calcium bromide, etc. as well as brines composed of three or more salts. Such brines include, for example, a mixture of zinc bromide, calcium bromide and calcium chloride. The disclosure is particularly applicable to the use of calcium and/or zinc containing brines. Further, a brine within the same density range as a zinc and/or calcium brine may be attained using the process disclosed herein. Where single salt brines and mixtures of salts are used, the density of such brines may be increased to be within the same range as zinc containing brines.

Where a monovalent salt is used as the brine, the fluid loss pill may be formed by introducing the crosslinked polymer directly to the brine. Typically, the volume ratio of the crosslinked polymer to brine is from about 1:50 to about 1:500.

The fluid may further contain glycerol. In an embodiment, the fluid loss pill contains brine and a slurry of the crosslinked polymer in glycerol. The glycerol in the slurry enhances hydration of the galactomannan in the brine. The fluid loss pill is composed of between about 2 to about 10 volume percent of the slurry and about 90 to about 98 volume percent of the brine. The volumetric ratio of crosslinked polymer to glycerol in the slurry is typically from about 1:1.5 to about 1:7.

The fluid loss pill may further contain a linear (non-crosslinkable) viscosifying polymer. In an embodiment, especially when the density of the brine having substantial divalent metal ions (such as calcium and/or zinc), the linear viscosifying polymer, with the glycerol, maintains the crosslinked polymer in a suspended state in the slurry.

The linear viscosifying polymer may be a salt of a sulfonated acrylamide. In an embodiment, the linear viscosifying polymer is a copolymer of the sulfonated acrylamide salt and a vinyl lactam.

In an embodiment, the sulfonated acrylamide salt is of the structural formula (I):

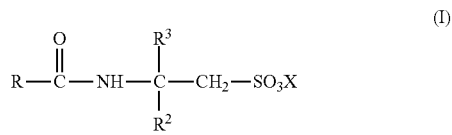

wherein R is selected from the group consisting of alkenyl groups having from about 1 to about 4 carbon atoms; R$^1$ and R$^2$ are selected from the group consisting of hydrogen and methyl groups; and, X is a cation, preferably an alkali metal, such as sodium. A preferred sulfonate monomer is 2-acrylamido-2-methylpropane sulfonic acid, sodium salt (commonly referred to as AMPS).

The N-vinyl lactam may be of the structural formula (II):

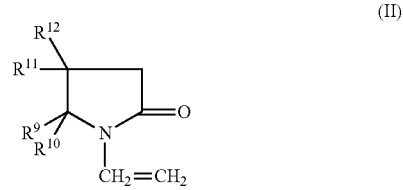

wherein R$^9$, R$^{10}$, R$^{11}$ and R$^{12}$ independently are selected from the group consisting of hydrogen, methyl, and ethyl. In an embodiment, the N-vinyl lactam may be N-vinyl-2-pyrrolidone (NVP).

Typically, the mole ratio of the sulfonated acrylamide salt, and the N-vinyl lactam in the copolymer is from about 50 to about 60 mole % of sulfonated monomer and between from about 25 to about 50 mole % of N-vinyl lactam.

In a less preferred embodiment, the linear non-crosslinkable viscosifying polymer is a water-soluble copolymer of polyacrylamide (PAM) and the sulfonated acrylamide salt. The polyacrylamide may originate from the olefinic amide monomer of the formula R(CO)N(R$^1$)—CH$_2$—R$^2$ wherein R is a 1-alkenyl group and R$^1$ and R$^2$ independently are selected from the group consisting of hydrogen and alkyl groups having from 1 to 4 carbon atoms.

In an embodiment, the linear viscosifying polymer has an average molecular weight (Mw) from about 0.5 to about 30 million Daltons, in some cases from about 1 to about 25 million Daltons, in other cases from about 4 to about 25 million Daltons; and in some cases, at least 2 million Daltons.

Suitable copolymers include those set forth in U.S. Pat. No. 9,902,894.

The linear viscosifying polymer is typically a solid, most notably a dry powder, and is water-soluble. The average particle size of the powder in some instances is at least 3000 μm, in other embodiments from about 35 to about 2000 μm; in other embodiments between from about 150 to about 450 μm.

The amount of the viscosifying polymer in the slurry is an amount sufficient to keep the crosslinked galactomannan suspended in the glycerol. When present, the volumetric ratio of the crosslinked galactomannan to linear viscosifying polymer is from about 5:1 to about 1500:1, the ratio of the crosslinked galactomannan to glycerol being from about 1:1.5 to about 1:7. The linear viscosifying polymer has not been observed to crosslink with the crosslinking agent.

The fluid loss pill may further may contain a dispersant. When present, the volumetric ratio of the crosslinked galactomannan to dispersant in the slurry is from about 1:25 to about 15:1.

Suitable dispersants include sorbitan derivatives, phenylpolymer with oxirane, monooctyl ether, polymer of phenylundoxiran, alkyl-modified organomodified siloxane, a siloxane polyolefin or an amphiphilic copolymer.

Suitable sorbitan derivatives include sorbitan trioleate and polyoxyethylene sorbitan, polyoxyethylene-sorbitan-fatty acid esters, for example polyoxyethylene(20)sorbitan monolaurate, polyoxyethylene(4)sorbitan monolaurate, polyoxyethylene(20)sorbitan monopalmitate, polyoxyethylene(20)sorbitan monostearate, polyoxyethylene(20)sorbitan tristearate, polyoxyethylene(20)sorbitan monooleate, polyoxyethylene(5)sorbitan monooleate and polyoxyethylene(20)sorbitan trioleate.

The dispersant may be a polyorganosiloxane derived from siloxane units having the general formula —($R_2$SiO)— in which the two monovalent groups R, which may be identical or different, are linear or branched alkyl groups having 1 to 18 carbon atoms, cycloaliphatic groups having 4 to 8 C atoms, linear or branched alkyl groups having 2 to 4 carbon atoms, phenyl- or alkyl phenyl groups having 1 to 12 carbon atoms in the aliphatic group (halogens or hydroxyl-, carboxyl-, carbonic acid anhydride, amino-, epoxy-, alkoxy- or alkenyloxy groups may be substituted for the hydrocarbon groups), polyether- or polyolefin groups and hydrogen, the groups being bonded together directly or via an oxygen or nitrogen atom with a silicon atom of the polysiloxane chain. Examples of such groups R are methyl-, ethyl-, isopropyl-, isobutyl, dodecyl- and octadecyl groups, cyclopentyl-, cyclohexyl- and cyclooctyl groups, vinyl-, allyl-, isoprepenyl and 3-butenyl groups, ethylphenyl-, dodecyl groups, and groups having hydrocarbon groups that are partially substituted, e.g., by halogens such as fluorine or chlorine, as is the case, e.g., with chloropropyl or the 1,1,1-trifluoropropyl group. At least a portion of the groups R may also consist of polymeric groups, in particular polyethers, such as polyethylene-, polypropylene-, polybutylene or polyhexamethylene glycol or polytetrahydrofuran and mixed polymers of these ethers, as well as polyolefins, e.g., polybutadiene, polyisoprene, polybutene, polyisobutene, or the like. Finally, a portion of the groups R may be hydrogen. It is also possible to use mixtures of the aforementioned polyorganosiloxanes.

Further, the dispersant may be at least one organo-modified siloxane compound, wherein the at least one organo-modified siloxane compound contains organoalkoxysiloxane units according to general formula (III):

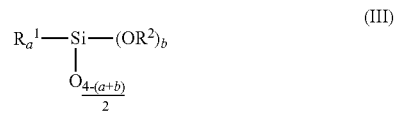

wherein:
$R^1$ is an alkyl radical and/or aryl radical,
$R^2$ is H and/or alkyl radical with 1 to 4 carbon atoms,
a is ≥0 and ≤2; and
b is >0 and ≤3
with the proviso that a+b≥1 and ≤4.

Formula (III) is an average formula of the organoalkoxysiloxane units of the organo-modified siloxane compound. The proportion of H for —$R^2$ can be ≥0% and ≤10%, preferably ≥0% and ≤5%, particularly preferably ≥0% and ≤1%, and especially preferably 0%. Preferably, the organo-modified siloxane disclosed herein is liquid at 25° C. Preferably, the substituents R 1 and/or $R^2$ of the organoalkoxysiloxanes of the liquid, organo-modified siloxane compound/s are those wherein $R^1$ is phenyl and/or $C_1$-$C_{16}$ alkyl radical, preferably $R^1$ is $C_1$-$C_{12}$ alkyl radical, more preferably $R^1$ is a $C_1$-$C_8$ alkyl radical, particularly preferably $R^1$ is a $C_1$-$C_4$ alkyl radical, wherein most preferably $R^1$ is methyl and/or ethyl; and/or $R^2$ is —H, methyl, ethyl, propyl, isopropyl, butyl or tert-butyl, where methyl and/or ethyl are most preferred. Furthermore, it is preferable that a is 0.5 to 1.8, preferably 0.7 to 1.7, and more preferably 1.0 to 1.5, with the proviso that a+b≤4 and preferably a+b≤3. In addition, it is also specified according to the invention that b is 0.1 to 2.5, preferably b is 0.2 to 2.3, still more preferably b is >0.3 to 2.0 and particularly preferably b is >0.3 to 1.2, with the proviso that a+b≤4 and preferably a+b is ≤3. The liquid organo-modified siloxane may have a molecular weight from 120 to 100,000, preferably 250 to preferably 500 to 60,000, more preferably 750 to 50,000 and particularly preferably 1,000 to 30,000. Further, suitable dispersants include polyethers containing units of 2-pentyloxirane, 2-methyl-3-phenyloxirane, 2,3-epoxypropylbenzene, 2-(4-fluorophenyl)oxirane. Suitable amphiphilic dispersants include polyethersiloxanes such as those disclosed in U.S. Pat. No. 8,034,848, as well as phospholipids, lecithins, betaines, sulfobetaines, as well as those based on nonionic fatty alcohol ethoxylates or alkylphenol ethoxylates and/or their anionically modified derivatives and tri- and partial glycerides and also fatty acids).

The slurry may further contain a hydrophilic oxygenated liquid, a hydrophobic oxygenated liquid or a combination thereof. Suitable hydrophilic and hydrophobic oxygenated liquids include propylene glycol n-propyl ether, propylene glycol methyl ether, tripropylene glycol methyl ether, dipropylene glycol methyl ether acetate, propylene glycol butyl ether, dipropylene glycol butyl ether, tripropylene glycol butyl ether and dipropylene glycol methyl ether and mixtures. Preferred hydrophobic and hydrophilic components are dipropylene glycol n-butyl ether and dipropylene glycol methyl ether, respectively. When present, the volumetric ratio of crosslinked galactomannan to hydrophilic oxygenated liquid, hydrophobic oxygenated liquid or the combination thereof in the slurry may be from about 1:0.8 to about 1:4. Typically, the volumetric ratio of the crosslinked polymer to glycerol is from about 1:1.4 to about 1:7 and the hydrophilic oxygenated liquid to the hydrophobic oxygenated liquid in the slurry is from about 1:3 to 3:1, preferably about 1:1.

In an embodiment, the fluid loss pill may contain the brine and a slurry comprising the crosslinked polymer, linear viscosifying polymer, glycerol, hydrophilic oxygenated liquid and/or hydrophobic oxygenated solvent as well as dispersant. In an embodiment, the fluid loss pill may contain from about 90 to about 98 volume percent of a brine having a density of 11.0 ppg or higher (such as a brine containing divalent metals like calcium and/or zinc) and from about 2 to about 10 volume percent of the slurry, the slurry comprising between from about 10 to about 20 volume percent of the crosslinked polymer, between from about 0.05 to about 3 volume percent of the linear viscosifying polymer, between from about 30 to about 75 volume percent of glycerol, between from 16 to about 40 volume percent of the hydrophilic oxygenated solvent/hydrophobic oxygenated solvent and between from about 2 to about 8 volume percent of the dispersant.

The pH of the fluid loss pill may be less than 6.0 and in some cases is between 3.5 and 6.5. Depending on the source of the brine, the pH may fluctuate. This is unlike conventional aqueous borate crosslinked well treatment fluids where the pH of the fluid must be increased to 8 or higher in order to crosslink the galactomannan with the borate salt. However, at such an elevated pH, divalent salts, such as calcium and/or zinc, precipitate. The viscosity of the fluid loss pill thereby decreases. In the past, galactomannan-based fluid loss pills containing a brine having substantial divalent metal ion (e.g., calcium and zinc) content have exhibited instability and have not been used at elevated downhole temperatures, such as in excess of 250° F.

With the fluid loss pill described herein, precipitation of salts is less of a concern and an alkaline oxide may be included in the fluid loss pill.

Typically, the pH of the disclosed fluid loss pill may be increased by the addition of an alkaline oxide. In light of the low pH of the disclosed fluid loss pill, the alkaline oxide may be included. The addition of the alkaline oxide enhances thermal stability of the fluid loss pill as well as enhances crosslinking (gelation) of the guar in the brine. The alkaline oxide may be added either prior to, with or after the addition of the crosslinking agent. The metal oxide is typically a Group II metal of the Periodic Table such as magnesium.

Further, the alkaline oxide may be added to the fluid loss pill as a buffer.

When used, the amount of amount of alkaline oxide in the fluid loss pill is from about 0.5 to about 7.5 volume percent.

In an embodiment, a fluid loss pill may be prepared by forming a slurry of the linear viscosifying polymer and glycerol. The brine portion contains slurry (glycerol, linear viscosifying polymer, optional dispersant, galactomannan, optional hydrophobic oxygenated ether and optional hydrophilic oxygenated ether), optional metal oxide and crosslinking agent. The two polymer systems may then be co-mingled into one solution to form the fluid loss control pill. The volume ratio of slurry to brine is from about 1:3 to about 1:20. The volumetric ratio of linear viscosifying polymer in the brine may be from about 1:30 to about 1:80. The volume percent of crosslinkable galactomannan is from about 0.5 to about 2 percent.

After viscosifying the brine to about 30 to about 60% of saturation, additional brine may be added. The salt of the additional brine may be dry salt. The dry salt may constitute all or a portion of the additional brine. Typically, the salt of the additional brine is the same salt as the salt of the brine initially added to the slurry. The amount additional brine may be an amount sufficient to render about 75 to about 95% of saturated brine. (As used herein, "saturated brine" refers to a brine having the maximum level of salt at which no further salt can be added to the brine without the salt falling out of solution. For instance, the amount of salt in sodium chloride, sodium bromide, potassium chloride, calcium chloride and calcium bromide brines is 26, 40, 24, 40 and 57%, respectively.)

In an embodiment, the amount of additional brine is about 2 to 4 times the amount of brine initially added to the slurry. For example, where 60 mls of brine is added initially to 20 mls of the slurry, an additional 60 mls of brine may be added over a period of time until the amount of brine in the resulting viscous fluid is about 350 mls (1 bbl equivalent). The final density of the liquid is the same or substantially the same (within 10%, or within 5%, or within 0.5 to 1%) as the density of the brine initially added to the slurry.

Once the brine is about 75 to 95% saturated, the crosslinking agent may then be added (optionally with an alkaline oxide) to render the fluid loss pill.

In an embodiment, thermal stability of the fluid loss pill may be enhanced by hydrating the galactomannan with a fluid containing the brine and a slurry of linear viscosifying polymer in glycerol. The fluid containing brine and slurry is then contacted with the initial slurry containing the linear viscosifying polymer in glycol, galactomannan, optional dispersant and/or hydrophobic organic/hydrophilic organic liquid. Hydration of the galactomannan in the brine then occurs. Typically, the linear viscosifying polymer in the brine-containing fluid is the same as the linear viscosifying polymer in the initial slurry.

After being pumped into the well, the fluid loss pill may slowly further gel as crosslinking of the galactomannan with the crosslinking agent occurs. Such further crosslinking occurs upon the fluid loss pill being situated at its desired location within the well The fluid loss pill brines disclosed herein may be used in any field of oil/gas technology that requires use of a fluid loss pill. As such, the fluid loss pill may be a component of an acid diverting system, fracturing fluid, completion fluid, workover fluid, drill-in fluid, insulating packer fluid, displacement spacer, cementing cleaning spacer, gravel pack carrier fluid, drilling mud, a coil tubing fluid for clean out, etc. Further, the viscous brines may be used to clean sand and silt deposits hampering the productivity of a producing well.

In an embodiment, the fluid loss pill may be selectively emplaced in the wellbore. A downhole anemometer or similar tool may be used to detect fluid flow downhole and thus where fluid may be lost to the formation. The relative location of the fluid loss may be determined by conventional methods.

In an embodiment, the fluid loss pill may be injected into a work string, flow to the bottom of the wellbore, and then out of the work string and into the annulus between the work string and the casing or wellbore. The pill may also be pushed by injection of other wellbore fluids, such as completion fluids, behind the pill to the site where fluid loss is suspected. Injection of fluids into the wellbore may then be stopped, as the pill then moves toward or into the fluid loss location. The fluid loss pill may then form a plug near or at the surface where fluid loss occurs. Fluid flow into the formation is thereby reduced.

While the above embodiments describe the brine fluid for use as a fluid loss pill, the brine fluid may be used for other applications such as killing a well. Another application is to introduce the fluid loss pill during pre-conditioning of the well, especially in high-permeable reservoirs prior to injecting a polymer-based fluid. The injection of the fluid loss pill minimizes the volume of polymer invasion into the formation before the polymer-based fluid forms a filter cake. Consequently, formation damage associated with the stimulation of highly permeable formations is reduced.

EXAMPLES

The following examples are illustrative of some of the embodiments of the present invention. Other embodiments within the scope of the claims herein will be apparent to one skilled in the art from consideration of the description set forth herein. It is intended that the specification, together with the examples, be considered exemplary only, with the scope and spirit of the invention being indicated by the claims which follow.

All percentages set forth in the Examples are given in terms of volume percentages except as may otherwise be indicated.

Example 1. A slurry was prepared containing about 55 ml glycerol and 0.1 g of a sodium salt of sulfonated acrylamide and vinyl lactam, commercially available as Diacel® HE® Polymer 400 from Chevron Phillips Chemical Company LP. About 3 ml of sorbitan trioleate was added and then about 20 g of hydroxpropyl guar followed by about 14 mls dipropylene glycol n-butyl ether and about 14 mls of dipropylene glycol methyl ether. Upon thickening, 20 ml of the resulting slurry was contacted with about 350 ml of calcium bromide brine (density of 14.2 ppg). Viscosity was increased by the addition of approximately 5 pounds per barrel (ppb) MgO followed by about 5 ppb of puffed boron. Fluid loss was then tested in an OFITE filter pressure with a permeable 40μ aloxite disk at a temperature of 300° F. and using a top pressure of 600 psi and a bottom pressure of 100 psi. Volume of fluid loss over time was recorded. Testing was complete when the pressure equalized after 1260 minutes (21 hours). The results are shown in Table I.

TABLE I

| Time, minutes | Volume, milliliters |
| --- | --- |
| Spurt | 44 |
| 1 | 48 |
| 5 | 54 |
| 10 | 57 |
| 15 | 61 |
| 30 | 62 |
| 60 | 72 |
| 120 | 103 |
| 180 | 115 |
| 240 | 120 |
| 1200 | 176 |
| 1260 | 206 |

Example 2. The procedure of Example 1 was repeated using a 11.0 ppg calcium bromide brine. Testing was conducted using a permeable 35μ aloxite disk at a temperature of 275° F. Testing was complete when the pressure equalized after 1298 minutes. The results are shown in Table II.

TABLE II

| Time, minutes | Volume, milliliters |
| --- | --- |
| Spurt | 59 |
| 1 | 61 |
| 5 | 64 |
| 10 | 65 |
| 15 | 69 |
| 30 | 74 |

TABLE II-continued

| Time, minutes | Volume, milliliters |
| --- | --- |
| 60 | 83 |
| 120 | 95 |
| 180 | 106 |
| 240 | 117 |
| 1260 | 234 |
| 1298 | 276 |

The spurt in Examples 1 and 2 forms a filter cake. Tables I and II demonstrate the filter cake starts to disintegrate in about 21 hours or greater. The data demonstrates the fluid loss pill controls fluid loss for at least 21 hours (pressure equalization in Tables I and II).

Example 3. A slurry was prepared from about 55 mls glycerol and about 0.1 grams of sodium salt of sulfonated acrylamide and vinyl lactam. About 3 ml of sorbitan trioleate was added to the slurry followed by about 20 grams of hydroxypropyl guar. As thickening occurred, about 14 mls dipropylene glycol n-butyl ether (hydrophobic glycol ether) and 14 mls dipropylene glycol methyl ether (hydrophilic glycol ether) was added. The hydroxypropyl guar was then hydrated by the addition of about 20 mls of the resulting slurry to about 220 mls of calcium bromide brine (density of 14.2 ppg). The calcium bromide brine further contained a slurry of about 9 ppb HE 400 in 105 mls glycerol. The amount of the slurry in the brine was 105 mls. Upon thickening, magnesium oxide was added (approximately 5 pounds per barrel (ppb) followed by about 5 ppb puffed boron. Then about 95 g of dry calcium bromide was added to provide a final density of 14.2 ppg.

Fluid loss was then tested in an OFITE high temperature high pressure fluid loss cell with a 35 micron aloxite disk at a temperature of 325° F. and using a top pressure of 600 psi and a bottom pressure of 100 psi. Volume of fluid loss over time was recorded. Testing was complete when the pressure equalized after 1260 minutes (21 hours). The results are shown in Table III.

TABLE III

| Time, minutes | Volume, milliliters |
| --- | --- |
| Spurt | 33 |
| 1 | 38 |
| 5 | 44 |
| 10 | 48 |
| 20 | 52 |
| 30 | 56 |
| 60 | 79 |
| 120 | 120 |
| 180 | 149 |
| 240 | 168 |
| 375 | 194 |
| 1395 | 211 |

As illustrated in Table III, the fluid loss pill was stable up to 1395 minutes at 325° F.

As illustrated in Table III, the fluid loss pill was stable up to 1395 minutes at 325° F.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the following claims.

What is claimed is:

1. A method of reducing fluid loss from a well or into a subterranean formation penetrated by a well, the method comprising:
(a) emplacing into the well a fluid loss pill comprising a brine and a partially crosslinked polymer comprising the product of an (i) underivatized guar or a derivatized guar and; (ii) a crosslinking agent comprising puffed boron particles having a density from about 0.05 to about 0.40 g/cc, a bulk density from about 150 to about 350 g/l and a diameter from about 420 to about 1,000 μm; and
(b) increasing the viscosity of the fluid loss pill under in-situ operating conditions at a targeted location within the well.

2. The method of claim 1, wherein the brine is a brine of a divalent metal.

3. The method of claim 2, wherein the brine is selected from the group consisting of calcium chloride, calcium bromide, zinc bromide and mixtures thereof.

4. The method of claim 1, wherein the derivatized guar is selected from the group consisting of hydroxypropyl guar, carboxymethyl guar and carboxymethyl hydroxypropyl guar and mixtures thereof.

5. The method of claim 4, wherein the derivatized guar is hydroxypropyl guar.

6. The method of claim 1, wherein the fluid loss pill comprises between from about 90 to about 98 volume percent of the brine and between from about 2 to about 10 volume percent of the crosslinked polymer.

7. The method of claim 1, wherein the fluid loss pill further comprises glycerol.

8. The method of claim 7, wherein the fluid loss pill comprises a slurry of the glycerol and the crosslinked polymer.

9. The method of claim 8, wherein the slurry comprises a copolymer of (i) a sodium salt of sulfonated acrylamide and a vinyl lactam; or (ii) polyacrylamide and a sodium salt of a sulfonated acrylamide.

10. The method of claim 9, wherein:
(a) the sodium salt of sulfonated acrylamide is of the formula:

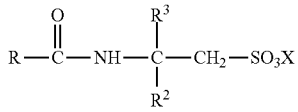

wherein R is selected from the group consisting of alkenyl groups having from about 1 to about 4 carbon atoms; $R^1$ and $R^2$ are selected from the group consisting of hydrogen and methyl groups; and X is an alkali metal; and/or
(b) the vinyl lactam is of the structure:

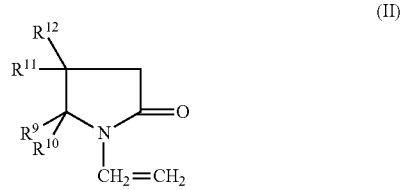

wherein $R^9$, $R^{10}$, $R^{11}$, and $R^{12}$ independently are selected from the group consisting of hydrogen, methyl, and ethyl.

11. The method of claim 9, wherein at least one of the following is true:
(a) the sodium salt of sulfonated acrylamide is the sodium salt of 2-acrylamide-2-methylpropane sulfonic acid; and/or
(b) the slurry further comprises a hydrophilic oxygenated liquid, a hydrophobic oxygenated liquid or a mixture thereof and/or dispersant.

12. The method of claim 11, wherein at least one of the following is true:
(i) the fluid loss pill contains a hydrophilic oxygenated and hydrophobic oxygenated mixture having members selected from the group consisting of propylene glycol n-propyl ether, propylene glycol methyl ether, propylene glycol n-butyl ether, dipropylene glycol n-butyl ether, dipropylene glycol methyl ether, tripropylene glycol methyl ether and dipropylene glycol methyl ether acetate; and/or
(ii) the fluid loss pill contains a dispersant, the dispersant being selected from the group consisting of sorbitan derivatives, a copolymer of a phenyl polymer and an oxirane, a polyorganosiloxane, an organo-modified siloxane or a siloxane polyolefin.

13. A method of reducing fluid loss from a well or into a subterranean formation penetrated by a well, the method comprising:
(a) emplacing into the well a fluid loss pill comprising a brine and a partially crosslinked polymer comprising the product of an (i) underivatized guar or a derivatized guar and (ii) a crosslinking agent comprising puffed boron particles, wherein the partially crosslinked polymer exhibits lipping and further wherein the partially crosslinked polymer contains from about 0.1 to about 2.5 volume percent of the crosslinking agent; the remainder being the underivatized guar or derivatized guar; and
(b) further crosslinking the underivatized guar or derivatized guar with the puffed boron particles once the fluid loss pill is emplaced into the well and increasing the viscosity of the fluid loss pill at a targeted location within the well;
wherein the puffed boron particles have a density from about 0.05 to about 0.40 g/cc, a bulk density from about 150 to about 350 g/l and a diameter from about 420 to about 1,000 μm.

14. The method of claim 13, wherein the fluid loss pill comprises:
(A) a brine having a density greater than or equal to 12.5 ppg; and
(B) a slurry comprising:
(a) the partially crosslinked polymer;
(b) a copolymer of (a) a sodium salt of sulfonated acrylamide and a vinyl lactam; or (ii) polyacrylamide and a sodium salt of a sulfonated acrylamide;
(c) glycerol;
(d) a hydrophilic oxygenated solvent and a hydrophobic oxygenated solvent; and
(e) a dispersant.

15. The method of claim 14, wherein the fluid loss pill comprises from about 90 to about 98 volume percent of the brine and from about 2 to about 10 volume percent of the slurry, wherein the slurry comprises:
(a) between from about 10 to about 20 volume percent of the crosslinked polymer of underivatized or derivatized guar and crosslinking agent;

(b) between from about 0.05 to about 3 volume percent of the copolymer;
(c) between from about 30 to about 71.95 volume percent of the glycerol;
(d) between from 16 to about 40 volume percent of the combination of hydrophilic oxygenated solvent and hydrophobic oxygenated solvent; and
(e) between from about 2 to about 8 volume percent of the dispersant.

16. The method of claim 13, wherein at least one of the following conditions is true:
(a) the fluid loss pill further comprises glycerol;
(b) the fluid loss pill further comprises a linear viscosifying polymer;
(c) the fluid loss pill further comprises a dispersant; or
(d) the fluid loss pill further comprises a hydrophilic oxygenated liquid, hydrophobic oxygenated liquid or a mixture thereof.

17. The method of claim 13, wherein the fluid loss pill further comprises a copolymer of either a sodium salt of sulfonated acrylamide and a vinyl lactam or polyacrylamide and a sodium salt of a sulfonated acrylamide.

18. A method for reducing fluid loss into a subterranean formation penetrated by a well:
A. pumping into a well a fluid loss pill comprising:
(i) a crosslinked polymer of underivatized guar or derivatized guar and a crosslinking agent comprising puffed boron particles having a density from about 0.05 to about 0.40 g/cc, a bulk density from about 150 to about 350 g/l and a diameter from about 420 to about 1,000 µm;
(ii) glycerol;
(iii) a copolymer of either a sodium salt of sulfonated acrylamide and a vinyl lactam or polyacrylamide and a sodium salt of a sulfonated acrylamide; and
(iv) a brine;
B. increasing the viscosity of the fluid loss pill at a targeted location within the well;
C. forming a plug at a surface of the subterranean formation; and
D. reducing fluid flow into the subterranean formation with the formed plug.

* * * * *